United States Patent [19]

Owens

[11] Patent Number: 4,511,072
[45] Date of Patent: Apr. 16, 1985

[54] DRINKING CUP HOLDER FOR AUTOMOBILES

[76] Inventor: Burgess Owens, 35 Northcote Dr., Dix Hills, N.Y. 11747

[21] Appl. No.: 623,496

[22] Filed: Jun. 22, 1984

[51] Int. Cl.³ .................... A47B 37/00; B65D 25/22
[52] U.S. Cl. .................................. 224/273; 108/44; 108/46; 220/85 H; D7/70
[58] Field of Search ................ 224/311, 273; 108/44, 108/46; D7/70, 37; 248/359 A, 359.1, 503, 503.1; 220/85 H

[56] References Cited

U.S. PATENT DOCUMENTS

| 1,974,221 | 9/1934 | Stonehouse | D7/37 X |
| 2,628,054 | 2/1953 | Fazakerley | D7/70 X |
| 2,754,078 | 7/1956 | Koger et al. | D7/70 X |
| 3,036,717 | 5/1962 | Johnson | D7/70 X |
| 3,107,028 | 10/1963 | De Roberts | D7/70 X |
| 3,312,436 | 4/1967 | Beghetto, Jr. | D7/70 X |
| 3,944,109 | 3/1976 | Holz | D7/37 X |
| 4,467,947 | 8/1984 | Minneman | 224/253 |

Primary Examiner—Stephen Marcus
Assistant Examiner—Robert Petrik
Attorney, Agent, or Firm—Charles E. Baxley

[57] ABSTRACT

A cup holder is provided for use in an automobile and is moveable between a closed mode to accommodate compact storage and an open mode wherein the cup holder is mountable in the automobile conveniently relative to a user. The cup holder includes a tray which receives a drinking cup. Oppositely disposed arms are connected to the tray and are moveable to engage the cup for stability.

9 Claims, 14 Drawing Figures

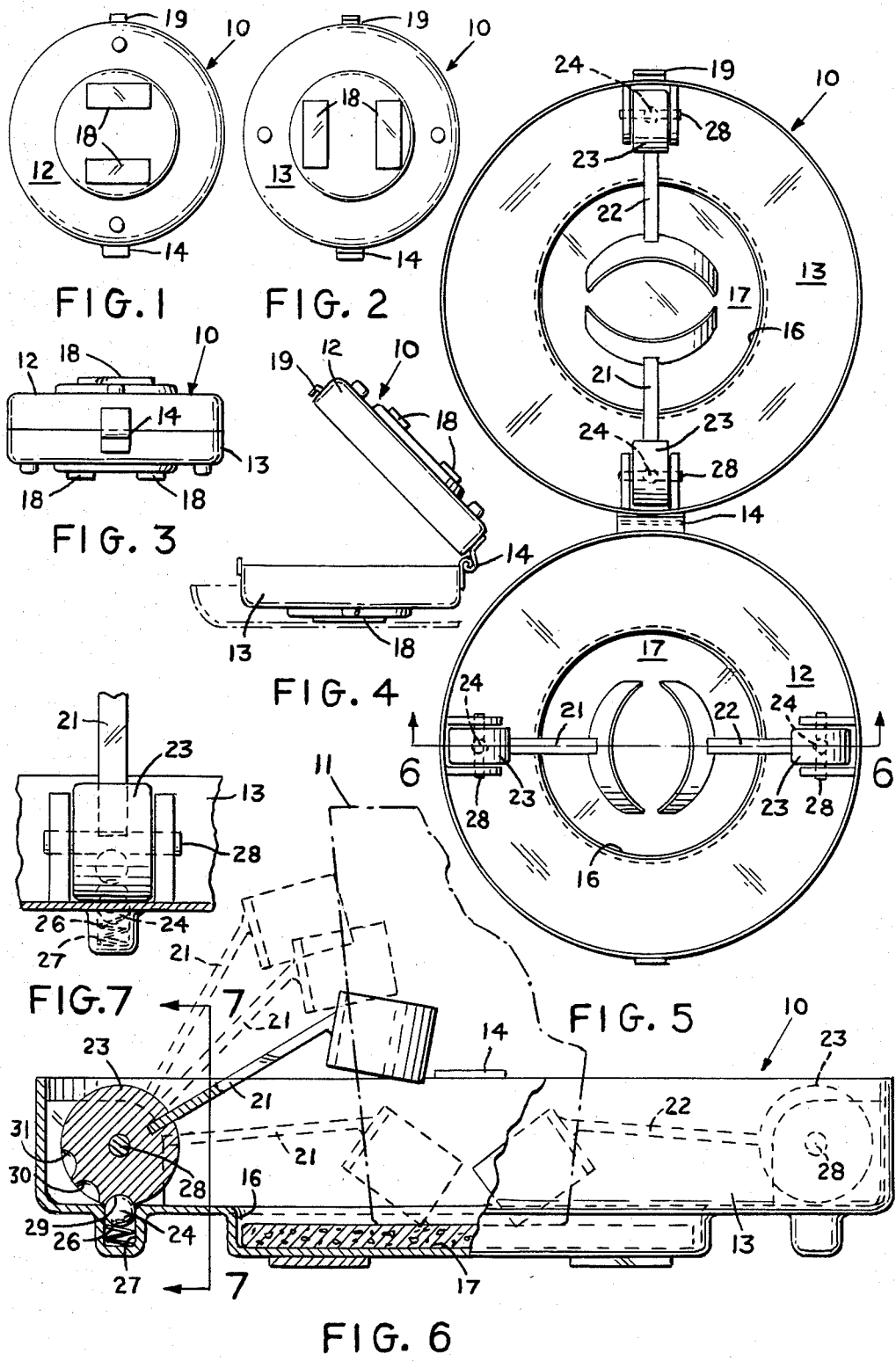

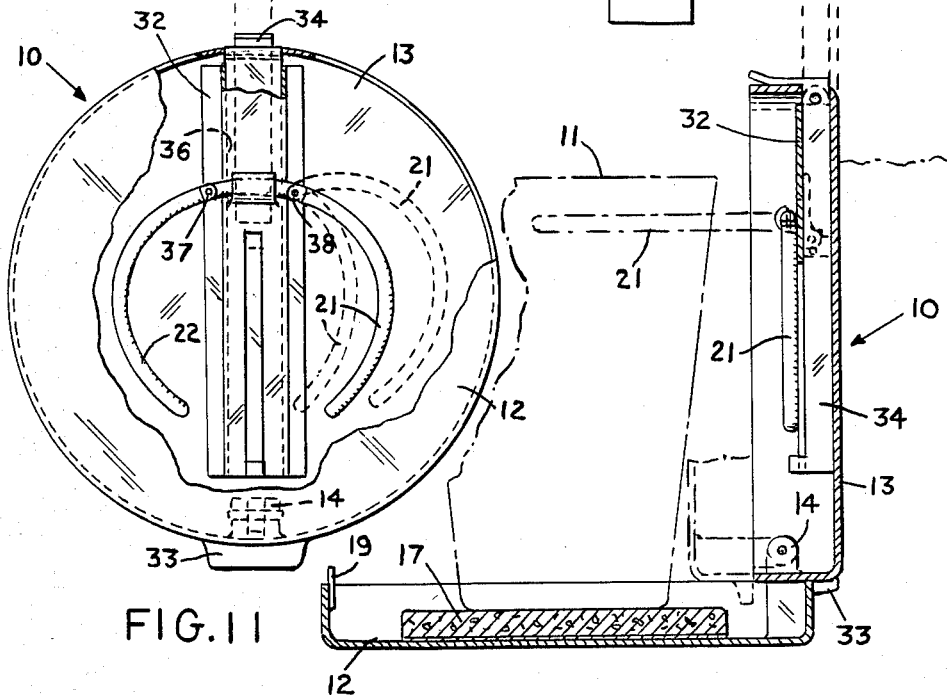

DRINKING CUP HOLDER FOR AUTOMOBILES

BACKGROUND OF THE INVENTION

1. Field of the Invention

This invention relates generally to construction of a cup holder for use in an automobile. More particularly the cup holder has a closed mode for compact storage and an open mode wherein it is mountable in the automobile conveniently relative to the driver or to a passenger. The cup holder may be stored in the glove compartment. It may be supported from a window structure, the dashboard or any flat surface, for example, from the inside of an open gloove compartment door.

Paper or plastic drinking cups for water, coffee, soft drinks and other beverages are used extensively in automobiles. Such cups are, by reason of their construction and materials, not inherently strong or stable and easily overturned or upset. Because it is often desirable to set a cup aside for a moment, as when the contained beverage is too hot or too cold or when the user wishes to free both of his hands for other purposes, the cups are many times placed on the floor or on other surfaces where they are likely to spill over or be upset.

2. Description of the Prior Art

U.S. Pat. No. Des. 191,444 to Messrs. John J. Schwartz and Arnold D. Verlo provided an inexpensive and handy cup tray for automobile use, but their cup tray was not convenient for use in moving automobiles.

U.S. Pat. No. 4,434,961 to Mr. Thomas M. Hoye offered a beverage holder apparatus useable in automobiles that pivoted about two axes and folded for storage. However, the Hoye apparatus was relatively complicated and somewhat bulky.

U.S. Pat. No. 2,903,225 to Mr. Berel I. Weinstein presented a relatively simple holder for drinking cups and the like that was adapted to be folded to a retracted position when not in use. The problem with the Weinstein holder was that its bracket remained in view, even when the holder was not in service.

U.S. Pat. No. 3,104,040 to Mr. Myron B. Stevens taught article holders for automobile floors.

U.S. Pat. No. 4,131,259 to Mr. Peter Franks employed suspension holders for beverage cups and other containers, but those holders took up too much space in the automobile.

U.S. Pat. No. 3,842,981 to Mr. Thomas H. Lambert suggested an apparatus of the type here contemplated, but the Lambert apparatus needed too much space.

SUMMARY OF THE INVENTION

The invention described and claimed herein comprises at least one tray foldable between an open or use mode and a closed mode for storage. Mounting means removably connect the tray to a support structure of the automobile for convenient positioning relative to either the driver or to a passenger. The tray is adapted to receive a cup therein and is provided with arms for holding the cup against tipping. Among objects of this invention are the following:

To provide a new, useful and unobvious beverage holder.

To provide a beverage holder which is foldable for convenient storage, for example, in the glove compartment.

To provide a beverage holder which is particularly well suited for use in moving automobiles.

BRIEF DESCRIPTION OF THE DRAWINGS

The foregoing and other features and advantages of this invention will appear more fully from descriptions of preferred embodiments which follow viewed in conjunction with accompanying drawings wherein:

FIG. 1 is a top plan view of a cup holder according to this invention, in its closed mode;

FIG. 2 is a bottom plan view of the cup holder of FIG. 1, likewise in its closed mode;

FIG. 3 is an end view of the cup holder of FIG. 1, likewise in its closed mode;

FIG. 4 is a side view of the cup holder of FIG. 1, partly opened;

FIG. 5 is a top plan view of the cup holder of FIG. 1, in its open mode;

FIG. 6 is a vertical sectional view, partly broken, taken along line 6—6 of FIG. 5;

FIG. 7 is a vertical sectional view, partly broken, taken along line 7—7 of FIG. 6;

FIG. 8 is a top plan view of another embodiment of the cup holder according to this invention in its closed mode;

FIG. 9 is a bottom plan view of the cup holder according to FIG. 8, likewise in its closed mode;

FIG. 10 is a side view of the cup holder of FIG. 8, likewise in its closed mode;

FIG. 11 is a top view, partly broken away, of the cup holder of FIG. 8 and partly in dotted lines to illustrate relative movability of parts;

FIG. 12 is a side elevational view in section of the cup holder of FIG. 8 in its operative condition and having a cup therein. Again dotted lines therein indicate relative movement of parts;

FIG. 13 is a detailed view in section of a bracket and hook suitable for mounting the cup holder of FIG. 8 on a window structure of an automobile;

FIG. 14 is an enlarged detailed view of the hook of FIG. 13.

DETAILED DESCRIPTION OF PREFERRED EMBODIMENTS

As seen on the first sheet of drawings, a preferred embodiment of a cup holder generally designated 10 is shown in FIG. 3 folded in its closed mode for storage, for example, in a gloove compartment of an automobile and in FIG. 6 in its open operative mode positionable on a relatively flat support structure of an automobile, such as the open door of the glove compartment, ready to receive a drinking cup 11 therein. As seen in FIGS. 4 and 5, the cup holder 10 includes a pair of trays, 12, 13 connected to each other by means of a hinge 14 between the open mode shown in FIG. 5 and the closed mode shown in FIG. 3 wherein the trays are adjacent each other for storage. The hinge 14 is arranged to be disengageable, so that the trays 12, 13 can be used separately. Each of the trays 12, 13 is provided with a well 16 having an absorbent pad 17 therein. Mounting means are shown as magnets 18 on the outer sides of the trays 12, 13 which are engageable to steel support surfaces of the automobile, whereby one or both of the trays 12, 13 can be positioned conveniently to the driver or to a passenger in the vehicle.

The cup holder 10 is provided with a clasp 19 for closing the trays as seen best in FIGS. 3 and 4.

As seen best in FIGS. 5, 6 and 7, pairs of arms 21, 22 are provided to engage a cup (not shown) therebetween. The arms 21, 22 are mounted on wheels 23 connected rotatably to one of the trays 12, 13. Balls 24 are biased by springs 26 in recesses 27 that engage the wheels in a plurality of notches 28, 29, 31 to position the arms 21, 22 in settings suitable for receiving various sizes of cups or containers therebetween.

To arrange the cup holder 10 for storage, the arms 21, 22 are collapsed and the trays 12, 13 are folded adjacent each other and clasp 19 retains the assembly closed.

A second embodiment of the cup holder 10 is shown in FIGS. 8–14. FIGS. 8, 9 and 10 depict the cup holder 10 in its closed mode suitable for storage, while FIG. 12 shows the cup holder 10 open and ready for use. A tray 12 is hingedly connected to a bracket 32 which forms the upper half of the assembly. A stop 33 is provided to position the tray 12 in a horizontal orientation while the bracket 32 is in a vertical position. A hanger member 34 is slidable in a keyway 36 out of the bracket 32 and is adapted for engaging a window structure of the automobile (not shown) for positioning the tray 12 conveniently relative to the driver or a passenger of the automobile. Retainer arms 21, 22 are moveable between a closed mode wherein they lay against the bracket 32 for storage and an open mode wherein they are normal to the bracket 32 and adapted for engaging a drinking cup 11 as best seen in FIG. 12. The retainer arms may be hinged at 37, 38 to accommodate large drinking cups.

It will be understood by those familiar with the art to which this invention most closely pertains that various changes may be made to the shown and described preferred embodiments, without departing from a main theme of invention defined in claims hereof.

I claim:

1. A cup holder for use in an automobile and characterized in combination by the following:
    a pair of trays connected each to the other and foldable between a spread operable mode and a closed mode wherein the trays are adjacent each other for storage;
    mounting means for connecting at least one of the trays to a support surface of the automobile convenient to a user;
    each of the trays adapted to seat a cup therein;
    each of the trays provided with a pair of oppositely disposed arms for engaging a cup.

2. The cup holder of claim 1 further characterized in that the mounting means comprises at least one magnet.

3. The cup holder of claim 1 further characterized in that each of the arms is pivotably connected to its tray and provided with a plurality of predetermined settings according to cup size.

4. The cup holder of claim 1 further characterized in that the trays are detachable each from the other.

5. The cup holder of claim 1 further characterized in that the retainer arms of one tray are arranged in a plane normal to a plane in which the retainer arms of the other tray are arranged.

6. The cup holder of claim 1 further characterized in that each of the trays defines a well having an absorbent pad therein.

7. A cup holder for use in an automobile and characterized in combination by the following:
    a tray suitable for mounting a cup thereon;
    a bracket connected to the tray and moveable hingedly between an open vertical position and a closed position adjacent the tray for storage;
    stop means for restricting the bracket in the open position substantially normal to the tray whereby the tray is positioned substantially horizontally;
    retainer arms spaced from the tray and connected to the bracket moveably between an open mode wherein they are normal to the bracket and adapted for embracing the cup and a closed mode wherein they lay along the bracket for storage;
    a hanger connected to the bracket slidably between an extending position and a retracted position for storage;
    the hanger having a distal end adapted for engaging a window structure of the automobile for positioning the tray conveniently relative to a user, whereby when not in service the hanger is moveable to its retracted position and the retainer arms are moved to their closed mode and the bracket is moved to its closed position all for compact storage of the cup holder.

8. The cup holder of claim 7 further characterized in that the retainer arms are connected hingedly to the bracket.

9. The cup holder of claim 7 further characterized in that the hanger has a hook connected to the distal end hingedly between
    an open position for engaging a window structure of the automobile
    and a closed position wherein it lays against the hanger for storage.

* * * * *